United States Patent [19]

Husted et al.

[11] Patent Number: 4,810,235
[45] Date of Patent: Mar. 7, 1989

[54] VARIABLE TRANSMISSION WITH AN INTEGRAL SHIFTER

[75] Inventors: Royce H. Husted, 711 Lakeside Dr., Wheaton, Ill. 60187; Samuel Shiber, P.O. Box 371, Mundelein, Ill. 60060

[73] Assignees: Samuel Shiber; Royce Husted, both of Wheaton, Ill.

[21] Appl. No.: 138,721

[22] Filed: Dec. 23, 1987

Related U.S. Application Data

[63] Continuation-in-part of Ser. No. 925,541, Oct. 27, 1986, Pat. No. 4,717,369, which is a continuation-in-part of Ser. No. 643,031, Aug. 21, 1984, Pat. No. 4,645,475, which is a continuation-in-part of Ser. No. 456,736, Jan. 10, 1983, Pat. No. 4,521,207, which is a continuation-in-part of Ser. No. 387,618, Jun. 11, 1982, Pat. No. 4,493,678, which is a continuation-in-part of Ser. No. 310,506, Oct. 13, 1981, abandoned.

[51] Int. Cl.⁴ .................... F16H 55/30; F16H 55/54
[52] U.S. Cl. ........................ 474/49; 474/50; 474/56
[58] Field of Search ............... 474/47, 49, 52, 54, 474/56, 57, 164

[56] References Cited

U.S. PATENT DOCUMENTS

| | | | |
|---|---|---|---|
| 2,421,368 | 6/1947 | Aubert | 474/56 |
| 3,995,508 | 12/1976 | Newell | 474/50 |
| 4,493,678 | 1/1985 | Husted | 474/57 |

*Primary Examiner*—Thuy M. Bui
*Attorney, Agent, or Firm*—Samuel Shiber

[57] ABSTRACT

A variable transmission with an integral shifter, particularly suitable for a bicycle, having a variable-sprocket mounted on an axle having crank-arms. The variable-sprocket comprises a drive-flange and a indexing-flange, a pair of sprocket-segment-planets and at least a pair of idler-planets connected to the flanges, the planets adapted to expand and contract in response to a relative rotation of the flanges and thereby increase and decrease, respectively, the effective diameter of the variable-sprocket; and the sprocket-segment-planets are arranged along an imaginary line defined by the crank-arms.

2 Claims, 2 Drawing Sheets

VARIABLE TRANSMISSION WITH AN INTEGRAL SHIFTER

CROSS REFERENCE TO RELATED APPLICATIONS

This application is a continuation in part of my pending application Ser. No. 06/925,541 filed Oct. 27, 1986, now U.S. Pat. No. 4,717,369 which is a continuation in part of my application Ser. No. 06/643,031 filed on Aug. 21, 1984 now U.S. Pat. No. 4,645,475, which is a continuation in part of my application Ser. No. 06/456,736 filed on Jan. 10, 1983 now U.S. Pat. No. 4,521,207 which is a continuation in part of my application Ser. No. 06/387,618 filed on June 11, 1982 now U.S. Pat. No. 4,493,678, which is a continuation in part of my application Ser. No. 06/310,506 filed on Oct. 13, 1981 which is now abandoned. The above parent applications are incorporated by reference.

BACKGROUND AND OBJECTIVES OF THE INVENTION

Conventional ten speed bicycle transmissions consist of a chain wrapped around a front double sprocket and a rear cluster containing five sprockets, a front and rear derailleurs for derailing the chain from one sprocket to another in response to a rider moving two control levers which are connected to the derailleurs. The derailleurs are made of a large number of delicate parts which need frequent maintenance and adjustment, and are easily damaged. The derailleur system is also hard to operate, it generates continuous noise and inefficiencies in certain gears due to chain's misalignment.

Due to the derailleur system deficiencies several attempts have been made in the past to introduce different systems, some of which are based on variable-sprockets. An example is found in British Pat. No. 453,712 by Neale and U.S. Pat. No. 3,938,403 by Donaldson. These and other designs while being workable lacked the degree of refinement and simplicity to be commercially successful.

An object of the present invention is to overcome these and other deficiencies of the prior art, and to provide a simple durable self-contained integral shifter which does not require additional connection or hardware attached to the bicycle's frame and which is, therefor, easy to install and economical to mass produce.

SUMMARY OF THE INVENTION

A variable transmission with an integral shifter, for providing a plurality of distinct transmission gear ratios, particularly suitable for bicycles. The transmission is based on a variable-sprocket comprising a drive-flange and an indexing-flange mounted on an axle with a pair of sprocket-segment-planets and at least two idler-planets slidably connected to the flanges forming a relatively rigid structure. The planets are adapted to expand and contract (that is, radially move away, and towards the center, respectively) in response to a phase angle between flanges caused by their relative rotation, and thereby increase or decrease the effective diameter of the variable-sprocket (the effective diameter, as used herein, shall mean the length of chain pulled by the sprocket per revolution, divided by 3.14). The shifting mechanism is self contained and does not rely on any hardware connected to the bicycle's frame (in contrast to derailleurs of Neale) nor does it rely on the frame to provide precision machined surfaces to interface with and obtain an external reaction from as does Donaldson. Instead, a transmission according to the present invention can be economically mass produced, preassembled together with the crank arm and the axle, and installed on the bicycle without any further adjustments.

DESCRIPTION OF THE SPECIFIC EMBODIMENT

Figure 2:
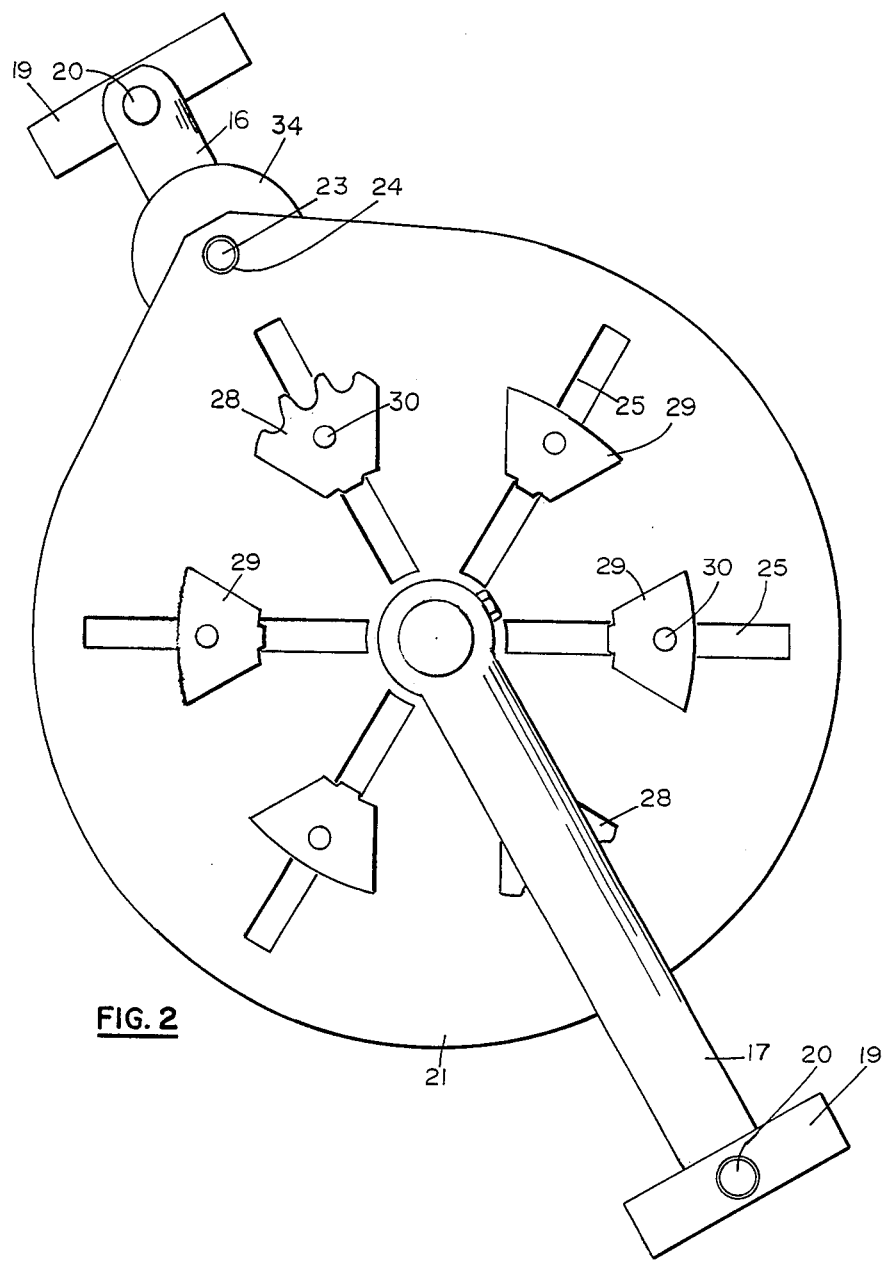
FIG. 2 shows a rear view of the variable transmission with an integral shifter.
Figure 1:
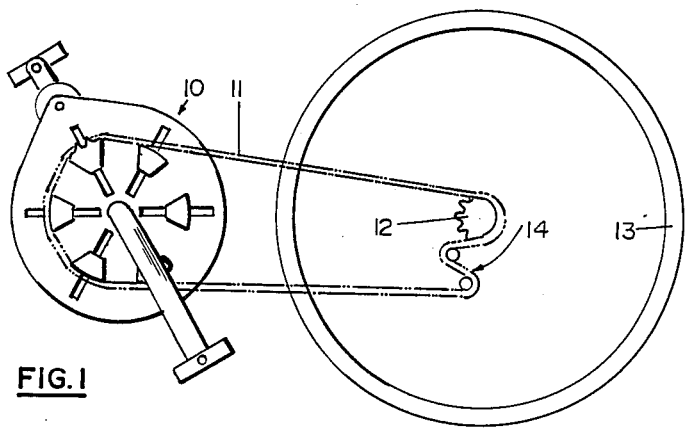
FIG. 1 shows a drive train of a bicycle equipped with a variable transmission with an integral shifter according to the present invention.
Figure 3:
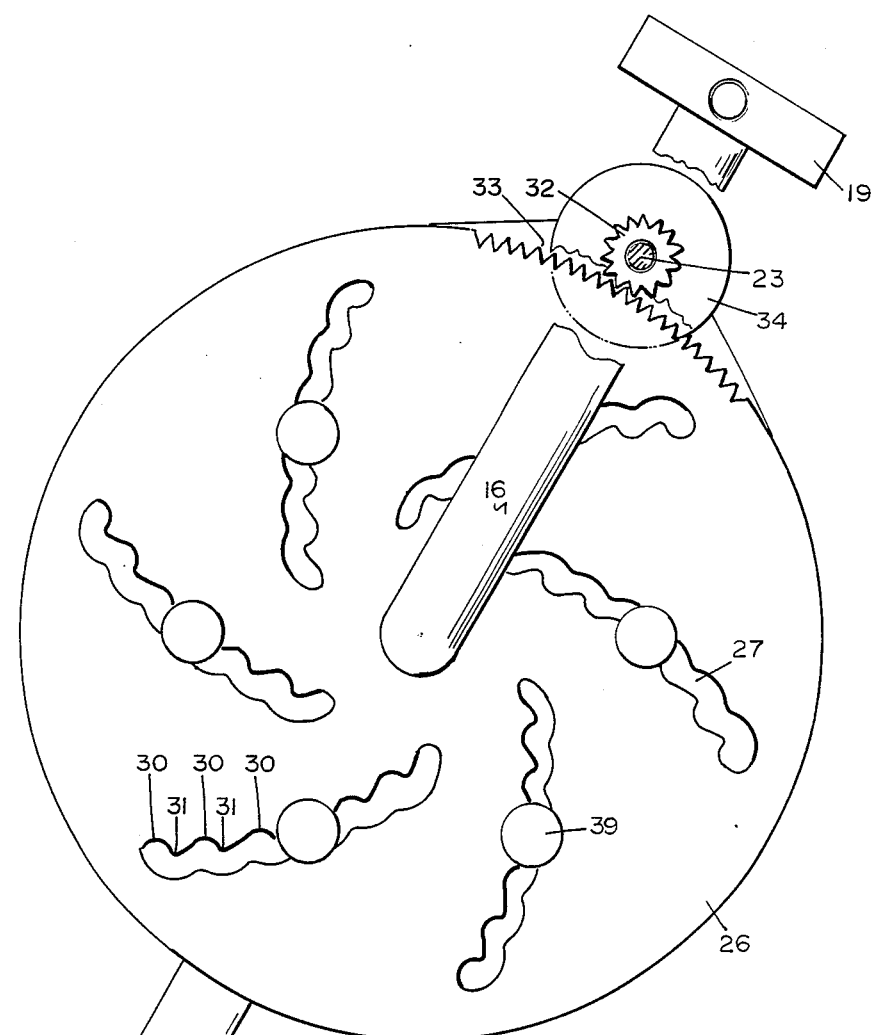
FIG. 3 shows a partially broken front view of the variable transmission with an integral shifter.
Figure 4:
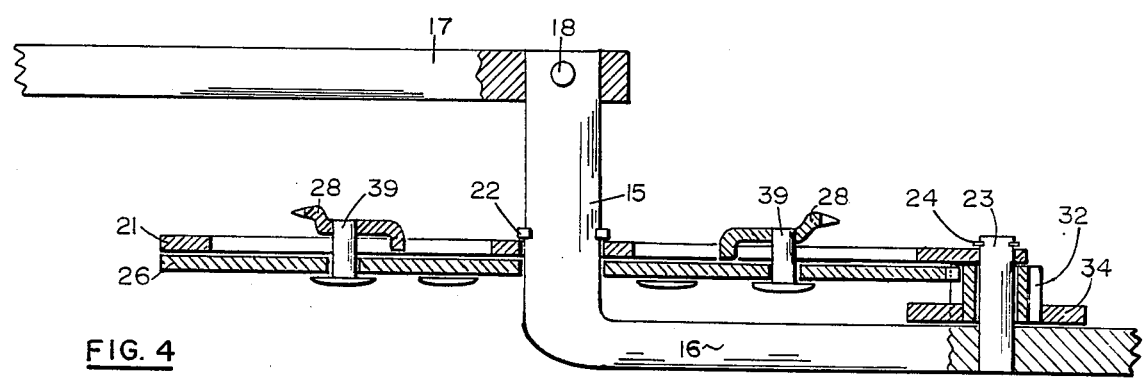
FIG. 4 shows a sectioned view of the variable transmission with an integral shifter.

FIG. 1 shows a drive train incorporating a variable transmission with an integral shifting means 10 according to the present invention. The term integral shifting means as used herein shall mean a shifting mechanism that is self contained in the transmission and does not have any hardware connection to the frame or other parts of the bicycle. A standard roller-chain 11 wraps aproximately half a turn around the transmission 10 and connects it to a conventional rear sprocket and a free wheeling assembly 12 which drives a rear wheel 13 of the bicycle. A conventional tensioner 14 serves to take up any slack in the chain.

The transmission 10 comprises:

An axle 15 integral with a crank arm 16. A second crank arm 17 is attached to the axle by a cross-bolt 18. Pedals 19 are rotatably mounted to the end of the cranks by shafts 20.

A drive flange 21 is mounted on the axle, secured by a snap-ring 22 and affixed to the crank 16 by a stud 23, secured thereto by a second snap-ring 24. The drive flange defines a plurality of radial key-ways 25.

An indexing flange 26 is rotatably mounted on the axle opposite of the drive flange and defines a plurality of spiral-wavy-cams 27.

Two chain engaging sprocket-segment-planets 28 and four chain supporting idler-planets 29 are connected to the flanges by rivets 39 which pass through, are engaged with and slidable along the respective key-ways and the respective spiral-wavy-cams. The position of the planets is determined by the intersections of the respective key-way and the spiral-wavy-cam.

The spiral-wavy-cam comprising a series of alternating depressions 30 and hills 31 which move the planets, closer and further from the axle, respectively, as the planets slide along the spiral-wavy-cam.

Shifting means which change a phase angle between the flanges and thereby the radial position of the planets is interposed between the flanges and is an integral part of the transmission 10. These means comprise a gear 32 which is rotatably mounted on the stud and engages a matching gear segment 33 formed on the indexing-flange, so that when the gear is rotated the indexing-flange is rotated relative to the drive-flange, changing the phase angle between them and moving the intersections of the wavy-cams and the key-ways together with the planets radially.

A disk 34 is affixed to the gear 32 to enable the rider to frictionally engage the disk with a sole of his shoe to rotate the gear and effect phase angle change between the flanges as described above.

While the present invention has been illustrated by one embodiment, it should be understood that various modifications and substitutions may be made without departing from the spirit of the invention or the scope of the claims.

I claim:

1. A variable transmission with an integral shifter comprising in combination:

an axle, a drive flange affixed to said axle, having a plurality of radial key-ways, an indexing flange rotatably mounted on said axle opposite of said drive flange and having a plurality of spiral-wavy-cams, two chain engaging sprocket-segment-planets and at least two idler-planets connected to said flanges, each engaged with and slidable along said respective key-way and said respective spiral-wavy-cams, the position of said sprocket-segment-planet being determined by an intersection of said key-way and said spiral-wavy-cams, as viewed in an axial direction, said spiral-wavy-cam comprising a series of alternating depressions and hills which move the planet, closer and further to said axle, respectively, as said planet slides along said spiral-wavy-cam, manually operated means for changing a phase angle between the flanges and thereby said intersection, interposed between said flanges.

2. The subject matter of claim 1, wherein a gear is rotatably mounted on an axle engaging a matching gear segment formed on said indexing flange so that when said gear is rotated said indexing-flange is rotated relative to said drive-flange, changing said phase angle between them and moving said intersection along said radial key-way.

* * * * *